United States Patent
Matsuzawa

(10) Patent No.: US 12,423,035 B2
(45) Date of Patent: Sep. 23, 2025

(54) PRINT CONTROL APPARATUS, METHOD FOR PRODUCING PRINTED OBJECT, AND PRINT CONTROL PROGRAM

(71) Applicant: SEIKO EPSON CORPORATION, Tokyo (JP)

(72) Inventor: Tomoki Matsuzawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/413,098

(22) Filed: Jan. 16, 2024

(65) Prior Publication Data
US 2024/0241677 A1    Jul. 18, 2024

(30) Foreign Application Priority Data
Jan. 17, 2023   (JP) .................................. 2023-005114

(51) Int. Cl.
*G06F 3/12*   (2006.01)

(52) U.S. Cl.
CPC .................................. *G06F 3/1232* (2013.01)

(58) Field of Classification Search
None
See application file for complete search history.

(56) References Cited

U.S. PATENT DOCUMENTS

2006/0279776 A1* 12/2006 Akiyama ................ G06F 3/121
                                                                  358/1.15
2008/0204789 A1*  8/2008 Hooglander ....... H04N 1/32502
                                                                  358/1.15

FOREIGN PATENT DOCUMENTS

JP            2015-005177 A       1/2015

* cited by examiner

*Primary Examiner* — Frantz Bataille
(74) *Attorney, Agent, or Firm* — Global IP Counselors, LLP

(57) ABSTRACT

A print control apparatus includes: a selection unit configured to receive selection of one printer from selectable printers; a setting unit configured to prohibit, in a first case where the selected printer is a distant printer located in an area different from the print control apparatus, a setting for immediately printing, and permit, in a second case where the selected printer is a near printer located in the same area as the print control apparatus, the setting for immediately printing; and a print control unit configured to transmit print data to the selected printer and cause the selected printer to print according to the setting of the setting unit.

9 Claims, 7 Drawing Sheets

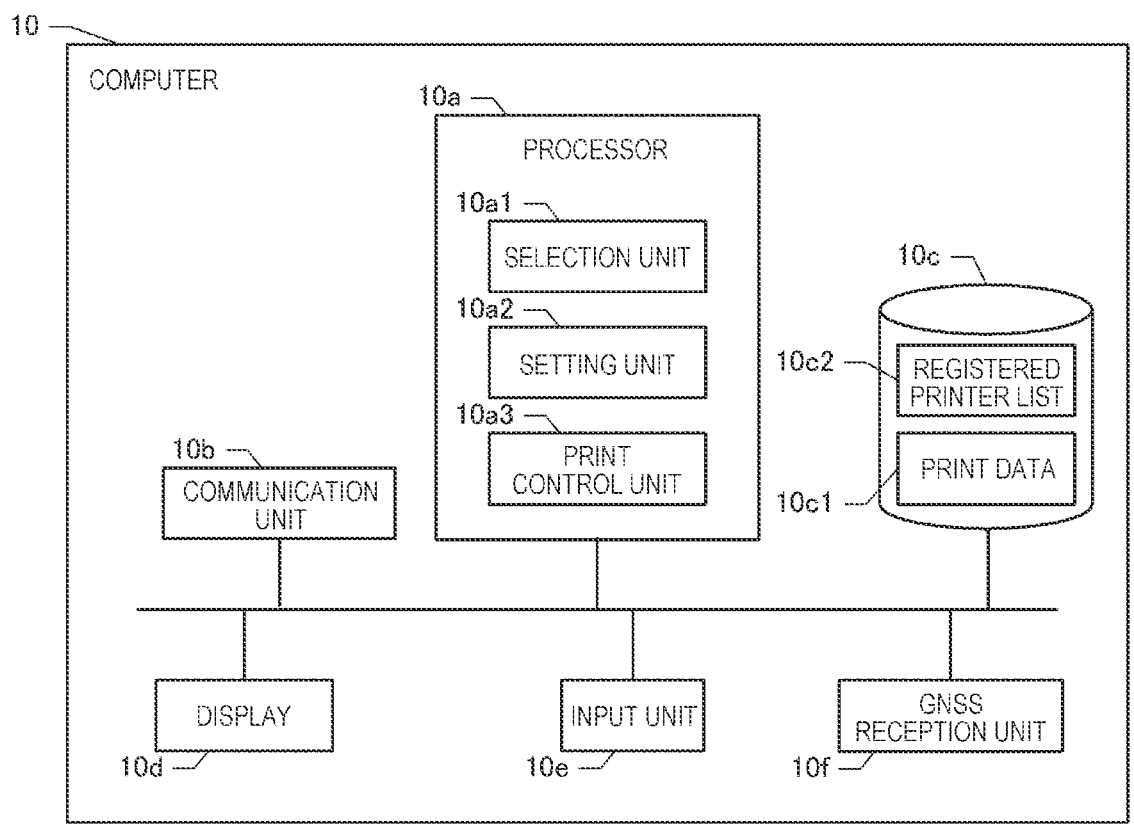

PRINT CONTROL APPARATUS, METHOD FOR PRODUCING PRINTED OBJECT, AND PRINT CONTROL PROGRAM

The present application is based on, and claims priority from JP Application Serial Number 2023-005114, filed Jan. 17, 2023, the disclosure of which is hereby incorporated by reference herein in its entirety.

BACKGROUND

1. Technical Field

The present disclosure relates to a print control apparatus, a method for producing a printed object, and a print control program.

2. Related Art

In the related art, there is known a technique enabling printing to be performed by any one of printers located in different areas (for example, see JP-A-2015-5177).

When printing can be performed by printers located in different areas, due to an operational error or the like, printing may be performed by a printer located in a distant area even when a user intends to print by a printer located in the same area as an area where the user is located.

SUMMARY

A print control apparatus for solving the above problem includes: a selection unit configured to receive selection of one printer from selectable printers; a setting unit configured to prohibit, in a first case where the selected printer is a distant printer located in an area different from the print control apparatus, a setting for immediately printing, and permit, in a second case where the selected printer is a near printer located in the same area as the print control apparatus, the setting for immediately printing; and a print control unit configured to transmit print data to the selected printer and cause the selected printer to print according to the setting of the setting unit.

A method for producing a printed object for solving the above problem is a method for producing a printed object to be printed by transmitting print data to a selected printer, the method including: generating, in a first case where the selected printer is a distant printer located in an area different from an area where a user is located, print data with a setting for not immediately printing; generating, in a second case where the selected printer is a near printer located in the same area as the area where the user is located, print data with a setting desired by the user between a setting for immediately printing and the setting for not immediately printing; and producing the printed object by causing the selected printer to print based on the print data.

A print control program for solving the above problem includes: causing a computer to operate as a setting unit configured to generate, in a first case where a printer selected as a print target is a distant printer located in an area different from an area where the computer is located, print data with a setting for not immediately printing, and generate, in a second case where the printer selected as the print target is a near printer located in the same area as the area where the computer is located, print data with a setting desired by a user between a setting for immediately printing and the setting for not immediately printing, and a print control unit configured to cause the selected printer to print according to the setting of the setting unit.

BRIEF DESCRIPTION OF THE DRAWINGS

FIG. 4 shows registered printer information.
FIG. 5 is a block diagram of a computer serving as a print control terminal.

DESCRIPTION OF EMBODIMENTS

Here, an embodiment of the present disclosure will be described according to the following order.
(1) Configuration of Print Control System
(1-1) Configuration of Printer
(1-2) Configuration of Server
(1-3) Configuration of Computer
(2) Print Control Process
(3) Other Embodiments

(1) Configuration of Print Control System

Figure 1:
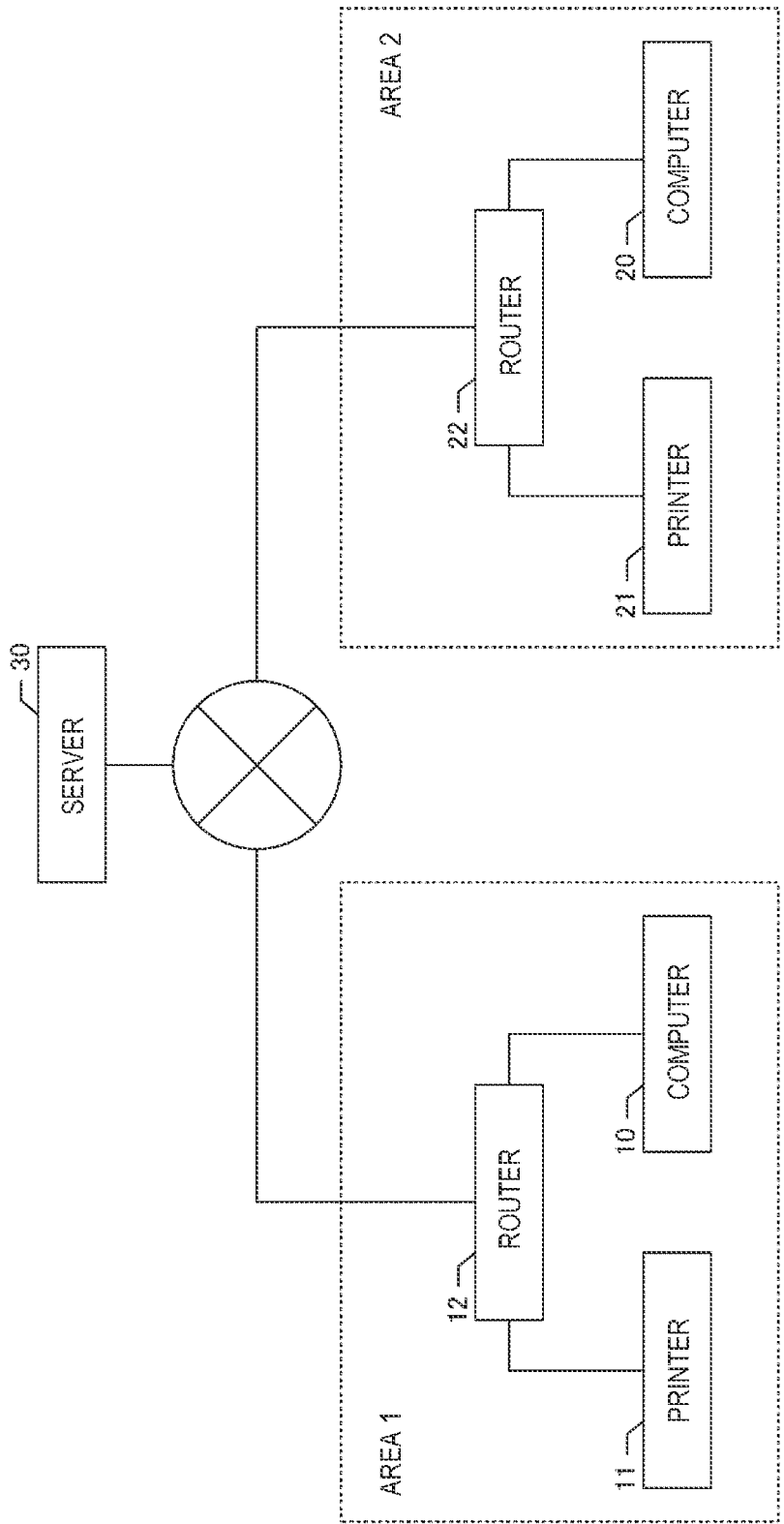
FIG. 1 is a block diagram of a print control system.

FIG. 1 shows an example of a print control system including a print control apparatus according to an embodiment of the present disclosure. The print control system includes electronic devices located in a plurality of areas and a server 30. In the example shown in FIG. 1, an area 1 and an area 2 are areas physically apart from each other. Here, an example is assumed in which the area 1 is a small scale office, and a user works in the area 1. The area 2 is assumed to be an office that is a workplace of the user.

There is a computer 10, a printer 11, and a router 12 in the area 1. The computer 10 and the printer 11 are connected to the router 12 by wired communication or wireless communication. That is, in the area 1, a local area network (LAN) is formed in which the computer 10 and the printer 11 can communicate with each other by the router 12. The router 12 controls communication with an external apparatus via the Internet. The computer 10 and the printer 11 can communicate with the server 30 and an electronic device in the area 2 via the router 12.

In the example shown in FIG. 1, in the area 2, there are electronic devices similar to those in the area 1. That is, in the area 2, there are a computer 20, a printer 21, and a router 22. In the area 2, the computer 20 and the printer 21 can communicate with each other by the router 22, and can communicate with an external apparatus.

In the present embodiment, the user operates the computer 10 to generate print data and issues an instruction to print contents indicated by the print data. At this time, the user can select not only the printer 11 but also the printer 21. In the embodiment, the server 30 operates to enable printing to such a printer located at a remote location. That is, the server 30 can receive a print request from the computer 10 via the Internet and cause the printer 11 or the printer 21 to print.

Thus, the user can print using the printer 21 located at a position away from the computer 10 operated by the user.

Accordingly, the user can cause the printer 21 to print a printed object to be used when the user goes to the office that is the workplace at the distant position or a printed object to be used by another person in the office that is the workplace.

However, most of needs when the user uses the printed object are needs for using the printed object printed by the printer 11 that is near the user. Accordingly, although the print control system according to the embodiment provides convenience of enabling printing by the printer 21 located at the distant position, there is a problem that the printed object may be wasted when the printer 21 is erroneously selected to print. There is also a problem that information printed on the printed object may be disclosed to an unexpected person. Therefore, in the embodiment, a process is executed in order to prevent printing caused by erroneous selection.

Hereinafter, each apparatus constituting the above-described print control system will be described.

(1-1) Configuration of Printer

Figure 2:
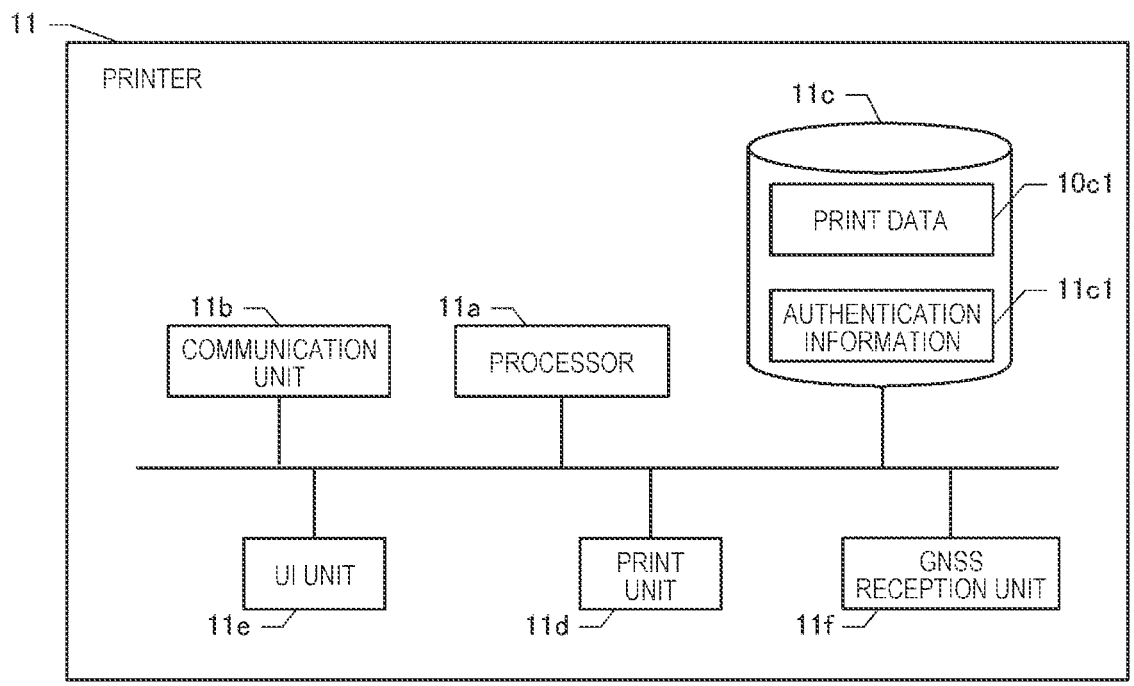
FIG. 2 is a block diagram of a printer.

FIG. 2 is a block diagram showing a configuration of the printer 11. The printer 11 includes a processor 11a, a communication unit 11b, a non-volatile memory 11c, a print unit 11d, a UI unit 11e, and a global navigation satellite system (GNSS) reception unit 11f. The processor 11a includes a CPU, a ROM, a RAM, and the like (not shown), and can execute various programs recorded in the non-volatile memory 11c to control each unit of the printer 11.

The processor 11a may be implemented by a single chip, may be implemented by a plurality of chips, or may be implemented as an SoC with various functional blocks. For example, an ASIC may be adopted instead of the CPU, or the CPU and the ASIC may cooperate with each other. When each apparatus in the present embodiment includes a processor, the processor may be implemented in various manners similarly to the processor 11a.

The communication unit 11b includes a communication interface for communicating with an external device according to various communication protocols. The printer 11 can communicate with the router 12 by the communication unit 11b and communicate with another apparatus via the router 12. The communication unit 11b may include an interface for communicating with various removable memories mounted on the printer 11.

The print unit 11d is a unit configured to perform printing and prints contents on a print medium. A print method is not limited, and various methods such as an ink jet method, a toner method, and a sublimation method can be adopted. The print medium is not limited to print paper and may be various print media such as cloth, ceramic, and resin. The print unit 11d includes an actuator and various apparatuses for printing on various media, a sensor, a drive circuit, a mechanical component, and the like.

The UI unit 11e includes at least one of a touch panel display, various keys, a switch, an LED, and the like. The touch panel display includes a display panel that displays various types of information such as a status of the printer 11 and a remaining amount of ink, and a touch detection panel superimposed on the display panel. The touch panel display detects a touch operation. The LED performs display in terms of lighting or blinking to indicate the status of the printer 11, or the like. The processor 11a can acquire operation contents of an administrator via the UI unit 11e. The processor 11a can also display various types of information on a display of the UI unit 11e to notify the administrator of the information.

The GNSS reception unit 11f is an apparatus that receives a signal output by a navigation satellite. Based on the signal received by the GNSS reception unit 11f, the processor 11a can identify coordinates (latitude and longitude) where the printer 11 is located.

In the embodiment, the printer 11 can print based on the print data transmitted from the server 30. That is, the processor 11a acquires print data 10c1 from the server 30 via the communication unit 11b and controls the print unit 11d based on the print data 10c1 to perform printing.

In the embodiment, the processor 11a can print in various modes and may execute an authentication print mode as one of the modes. The authentication print mode is a mode in which printing is not performed immediately after the print data 10c1 transmitted from the server 30 to the printer 11 is received, and execution of printing is suspended until an authentication operation is performed by the user. Thus, the authentication print mode is set such that, by requesting authentication from the user, printing is performed after the user arrives at the printer 11.

Specifically, when setting information indicating the authentication print mode is associated with the print data 10c1 received from the server 30, the processor 11a stores the print data 10c1 in the non-volatile memory 11c and stands by. Meanwhile, the user moves to the printer 11 and performs a log-in operation by directly operating the UI unit 11e by the user. The log-in operation may be performed by various methods, and in the embodiment, the log-in operation is performed by inputting authentication information (a user ID, a password, and the like) assigned to the user.

In order to perform such authentication, authentication information 11c1 is stored in advance in the non-volatile memory 11c. The authentication information 11c1 includes a user ID for identifying the user and a password associated with the user ID. When the user inputs the authentication information by the log-in operation, the processor 11a refers to the authentication information 11c1 and determines whether the input authentication information matches information registered as the authentication information 11c1. When a match is established, the processor 11a allows the user to log in. After logging in, the user can instruct execution or cancellation of printing by operating the UI unit 11e. When execution of printing is instructed, the processor 11a controls the print unit 11d to print based on the print data 10c1. When cancellation is instructed, the processor 11a deletes the print data 10c1 from the non-volatile memory 11c.

When the received authentication information does not match the information registered as the authentication information 11c1, the log-in is not allowed and the printing based on the print data 10c1 is not performed. When the log-in is not allowed, the print data 10c1 may be automatically deleted from the non-volatile memory 11c after a lapse of a predetermined time since the acquisition of the print data 10c1. The configuration described above is the configuration of the printer 11, and the printer 21 may also have the same configuration as the printer 11. However, there may be models that can perform authentication printing and models that cannot perform authentication printing.

(1-2) Configuration of Server

Figure 3:
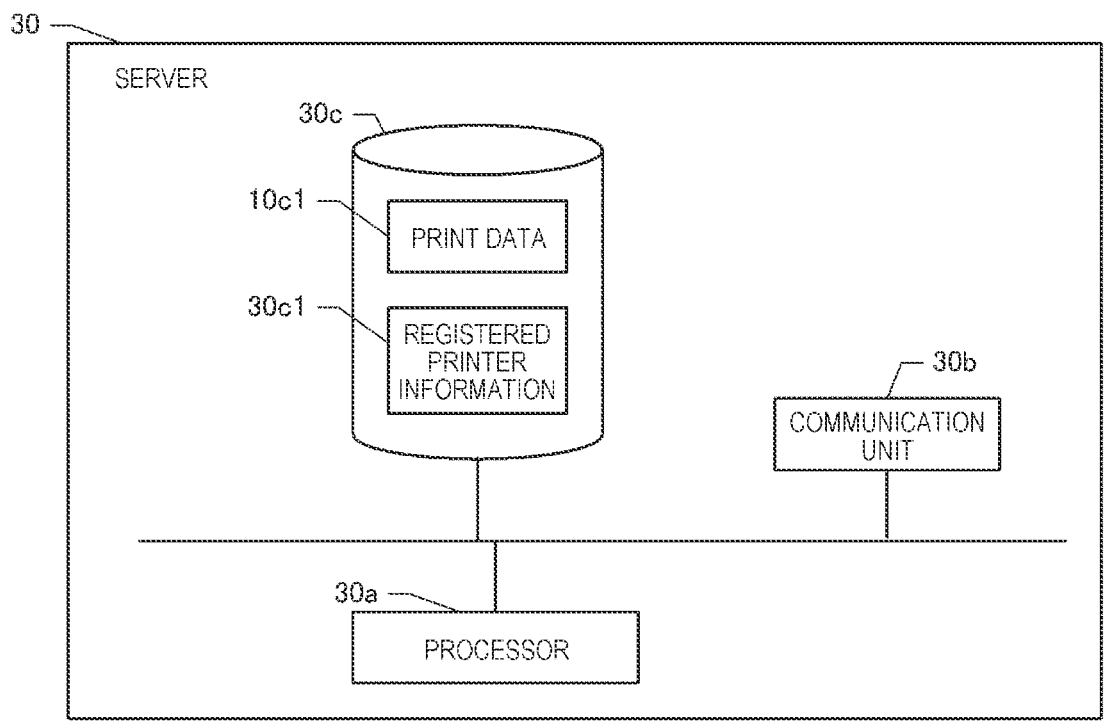
FIG. 3 is a block diagram of a server.

FIG. 3 is a block diagram showing a configuration of the server 30. The server 30 includes a processor 30a, a communication unit 30b, and a non-volatile memory 30c. The processor 30a includes a CPU, a ROM, a RAM, and the like (not shown), and can execute various programs recorded in the non-volatile memory 30c to control each unit of the server 30 and each apparatus connected to the network.

The communication unit 30b includes a communication interface for communicating with an external device according to various communication protocols. The server 30 can communicate with another apparatus via the communication unit 30*b* and a router (not shown). The communication unit 30*b* may include an interface for communicating with various removable memories mounted on the server 30.

Various types of information are stored in the non-volatile memory 30*c* of the server 30. For example, registered printer information 30*c*1 indicating a registered printer registered, by an instruction from the server 30, as a printer that can print is recorded in the non-volatile memory 30*c*. FIG. 4 shows an example of the registered printer information 30*c*1. In the embodiment, the registered printer information 30*c*1 is formed by associating a printer ID for identifying each registered printer with position information on each registered printer and availability of authentication printing. The printer ID may be any information through which the registered printer can be distinguished, and is a specific name assigned to each registered printer in the embodiment. In FIG. 4, a printer 001 is a name of the printer 11, and a printer 002 is a name of the printer 21.

The printer position information includes GNSS information indicating a position of an area where each registered printer is located and an IP address assigned to the area. In the embodiment, the GNSS information is coordinates (latitude and longitude) where the registered printer is located, and is acquired by a GNSS reception unit provided in each registered printer. The IP address assigned to the area is a global IP address of a router to which the registered printer is connected. For example, in the example shown in FIG. 4, since the printer 11 having the name of the printer 001 is connected to the router 12, a global IP address xxx.xxx.xxx.xxx shown in FIG. 4 is a global IP address assigned to the router 12. Coordinates (X1, Y1) are location coordinates of the printer 11 acquired by the GNSS reception unit of the printer 11.

The availability of authentication printing is information indicating whether the printer indicated by the printer ID is a model that can execute an authentication printing function. FIG. 4 shows an example in which the printers 11 and 21 can both perform authentication printing.

The registration of the printer into the registered printer information 30*c*1 is performed in advance before printing by each registered printer. The registration is performed by the user operating the computer 10 or the computer 20. For example, the user operates an input unit 10*e* of the computer 10 to designate the printer 11 as the registered printer that can print according to the instruction from the server 30. When the designation is performed, the computer 10 transmits the printer ID of the printer 11, the coordinates of the printer 11, the global IP address of the router 12, and the availability of authentication printing to the server 30. The server 30 acquires such information via the communication unit 30*b* and stores the information in the non-volatile memory 30*c* as the registered printer information 30*c*1. Registration of the printer 21 into the registered printer information 30*c*1 may be performed from a remote location, for example, from the computer 10.

When the print data is transmitted from the outside to the server 30, the print data is stored in the non-volatile memory 10*c*. For example, when the print data 10*c*1 is transmitted from the computer 10 to the server 30 in order to print by the printer 11, the print data 10*c*1 is recorded in the non-volatile memory 30*c*. Based on the registered printer information 30*c*1, the processor 30*a* identifies the global IP address associated with the router 12 in the area where the printer 11 selected as a print execution printer is located. The processor 30*a* transmits the print data 10*c*1 to a destination, that is, the printer 11 connected to the router 12 associated with the global IP address. As a result, the printer 11 prints based on the print data 10*c*1.

(1-3) Configuration of Computer

FIG. 5 is a block diagram showing a configuration of the computer 10. The computer 10 includes a processor 10*a*, a communication unit 10*b*, a non-volatile memory 10*c*, a display 10*d*, the input unit 10*e*, and a GNSS reception unit 10*f*. The processor 10*a* includes a CPU, a ROM, a RAM, and the like (not shown), and can execute various programs stored in the non-volatile memory 10*c* to control each unit of the computer 10.

The communication unit 10*b* includes a communication interface for communicating with an external device according to various communication protocols. The computer 10 can communicate with the router 12 by the communication unit 10*b* and communicate with another apparatus via the router 12. The communication unit 10*b* includes an interface for communicating with various removable memories mounted on the computer 10.

The display 10*d* is a display apparatus that displays any image. The input unit 10*e* is an apparatus through which a user performs an input operation, and includes, for example, a keyboard and a mouse. In the embodiment, it is assumed that the computer 10 is a stationary terminal, and of course, the computer 10 may be a terminal of another aspect. For example, the computer 10 may be a tablet terminal or a smartphone terminal. When the computer 10 is such a terminal, the input unit 10*e* may be implemented by a touch panel or the like. In any case, the user can input an intention of the user by operating the input unit 10*e* while visually recognizing an image or a character displayed on the display 10*d*.

The GNSS reception unit 10*f* is an apparatus that receives a signal output by a navigation satellite. Based on the signal received by the GNSS reception unit 10*f*, the processor 10*a* can identify coordinates (latitude and longitude) where the computer 10 is located.

The processor 10*a* executes a print control program (not shown). When the processor 10*a* executes the print control program, the computer 10 functions as a print control apparatus. When the print control program is executed, the processor 10*a* functions as a selection unit 10*a*1, a setting unit 10*a*2, and a print control unit 10*a*3. The selection unit 10*a*1 is a function of receiving selection of one printer from selectable printers. In the embodiment, printers that can print according to the instruction from the server 30 are registered as registered printers in advance, and such information is stored in the non-volatile memory 30*c* as the registered printer information 30*c*1.

The user can select a print target printer from the registered printers. Specifically, the computer 10 issues an acquisition request to acquire a list of the registered printers that can print according to the instruction from the server 30. When the acquisition request is issued, the server 30 refers to the registered printer information 30*c*1, generates a registered printer list 10*c*2 indicating a list in which information on settable items including the availability of authentication printing is associated with each printer ID, and transmits the registered printer list 10*c*2 to the computer 10. The processor 10*a* acquires the registered printer list 10*c*2 and stores the registered printer list 10*c*2 in the non-volatile memory 10*c*.

As described above, when the user prints any contents in a state in which the registered printer list 10*c*2 is registered in advance, the processor 10*a* refers to the registered printer list 10*c*2 and displays a list of registered printers on the display 10*d* according to the function of the selection unit

10*a*1. The user operates the input unit 10*e* to select one registered printer from the list of registered printers. The processor 10*a* receives the selected registered printer and identifies the selected registered printer as the print execution printer.

The print control unit 10*a*3 is a function of transmitting the print data 10*c*1 to the selected registered printer to cause the selected registered printer to print according to various settings. Contents indicating a print target may be generated in various forms. For example, the user operates the input unit 10*e* to operate an application program (not shown) and thus generates the contents indicating the print target. Of course, information indicating the contents indicating the print target may be transferred to the computer 10 by a non-volatile memory or the like.

The user can apply various settings, such as a color used for printing, the number of print copies, and print quality to the contents of the print target. For this reason, the user uses a function of the application program to issue a print instruction including specification of the contents indicating the print target and specification of the settings. By the function of the print control unit 10*a*3, the processor 10*a* generates the print data 10*c*1 for printing the contents according to the settings and stores the print data 10*c*1 in the non-volatile memory 10*c*. A print setting is applied to printing of the contents by being reflected in contents of the print data 10*c*1 or by including information indicating the setting in a part of the print data 10*c*1. For example, in a case of a setting for changing contents of image processing such as print quality, the setting is reflected in printing by including image data generated by the image processing in the print data 10*c*1. On the other hand, in a case of a setting that can change an operation of the printer, such as whether to perform authentication printing, information indicating whether to perform the operation is provided in the print data 10*c*1. When the printer prints based on the print data 10*c*1, the print setting is reflected by performing the operation indicated by the information.

In the embodiment, the process of generating the print data 10*c*1 is executed by the computer 10, and the process may also be executed by the printers 11 and 21, or by the server 30 and the computer 20. When the print data 10*c*1 is generated, the processor 10*a* transmits the print data 10*c*1 to the server 30 by the function of the print control unit 10*a*3. Upon receiving the print data 10*c*1, the server 30 transmits the print data 10*c*1 to the registered printer selected as the print execution printer. As a result, the print execution printer prints based on the print data 10*c*1.

In the above configuration, the user can select the printer 11 located in the same area as an area where the user is located or the printer 21 located in a different area. For this reason, the user may erroneously select the printer 21 even though the printer 11 is intended to perform printing. In order to prevent execution of printing due to such erroneous selection, in the embodiment, the authentication print mode is forcibly set when there is a possibility of erroneous selection.

To perform such a setting, the processor 10*a* functions as the setting unit 10*a*2. The setting unit 10*a*2 is a function of prohibiting, in a first case where the selected printer is a distant printer located in an area different from the self, a setting for immediately printing, and permits, in a second case where the selected printer is a near printer located in the same area as the self, the setting for immediately printing.

Specifically, in the embodiment, the setting is performed based on whether the selected printer is the distant printer or the near printer. In the embodiment, the "self" refers to the computer 10 which is the print control apparatus. Accordingly, when viewed from the computer 10, the printer 11 is the near printer, and the printer 21 is the distant printer.

In the embodiment, an area where the computer 10 is located is identified by the coordinates where the computer 10 is located and the global IP address of the router to which the computer 10 is connected. For this reason, by the function of the setting unit 10*a*2, the processor 10*a* transmits a transmission request for transmitting position information, that is, the coordinates and the global IP address of the registered printer selected as the print execution printer via the communication unit 30*b*. In response to the transmission request, the processor 30*a* of the server 30 acquires the position information on the registered printer selected as the print execution printer and returns the position information to the computer 10.

By the function of the setting unit 10*a*2, the processor 10*a* also acquires an output signal of the GNSS reception unit 10*f* and identifies the coordinates of the computer 10. By the function of the setting unit 10*a*2, the processor 10*a* communicates with the router 12 and acquires the global IP address assigned to the router 12.

By the function of the setting unit 10*a*2, the processor 10*a* determines that the coordinates of the computer 10 match the coordinates of the registered printer when the coordinates of the registered printer are within a specific distance from the coordinates of the computer 10. By the function of the setting unit 10*a*2, the processor 10*a* determines that the global IP address corresponding to the computer 10 matches the global IP address corresponding to the registered printer when the global IP address of the router with which the computer 10 communicates is the same as the global IP address associated with the registered printer selected as the print execution printer.

When the coordinates and the global IP address are both matched, the processor 10*a* determines that the area registered in association with the registered printer selected as the print execution printer is the same area as the computer 10, and the registered printer is the near printer. When at least one of the coordinates and the global IP address is not matched, the processor 10*a* determines that the area registered in association with the registered printer selected as the print execution printer is an area different from the computer 10, and the registered printer is the distant printer.

In the embodiment, in the first case where the selected registered printer is the distant printer, the setting for immediately printing is prohibited. As described above, in the embodiment, when the authentication print mode is not set, the setting is for immediately printing, and when the authentication print mode is set, the setting is for not immediately printing (setting for not printing until user authentication is completed). Therefore, in the first case where the selected registered printer is the distant printer in the area different from the computer 10, the processor 10*a* forcibly sets the authentication print mode. For this reason, even when the user issues a print instruction without setting the authentication print mode, the processor 10*a* modifies information on authentication printing in the print data 10*c*1 generated by the print control unit 10*a*3 and changes the setting such that authentication printing is performed. Thus, printing under a setting other than the authentication print mode is prohibited. If the user sets the authentication print mode and issues the print instruction, the print data 10*c*1 generated by the print control unit 10*a*3 is directly transmitted, and authentication printing is performed.

In the second case where the selected registered printer is the near printer in the same area as the computer 10, the processor 10a does not automatically set the authentication print mode. For this reason, when the user issues the print instruction without setting the authentication print mode, the processor 10a does not modify the information on authentication printing in the print data 10c1 generated by the print control unit 10a3 and is in a state in which printing is immediately performed without applying authentication printing. Thus, printing under a setting other than the authentication print mode is permitted. Of course, if the user sets the authentication print mode and issues the print instruction, the print data 10c1 generated by the print control unit 10a3 is directly transmitted, and authentication printing is performed. When printing is performed, it can be said that a printed object is produced.

When printing is performed based on the print data 10c1 set as described above, if the user selects the distant printer, printing is not performed immediately, and printing is not performed until the user arrives at the distant printer and logs in. For this reason, even when the user erroneously selects the printer 21 and issues the print instruction while intending to use the printer 11, printing is not performed until the user arrives at the printer 21. If printing is not intended, the user may move to the front of the printer 11 and operate the printer 11 to instruct cancellation of printing based on the print data 10c1. Of course, an instruction to cancel printing at the printer 21 may be issued from the computer 10. Alternatively, if no printing is performed, the print data 10c1 may be deleted after a lapse of a predetermined time since generation of the print data 10c1.

According to the above configuration, it is possible to prevent occurrence of wasteful printing due to erroneous printer selection. In addition, it is possible to prevent information printed on a printed object from being disclosed to an unexpected person. If the printer is not erroneously selected and the printer 21 is intended, the user may instruct the printer 21 to print after logging in. As a result, the printer 21 prints based on the print data 10c1. The above configuration is the configuration of the computer 10, and the computer 20 may also have the same configuration as the computer 10.

(2) Print Control Process

Figure 6:
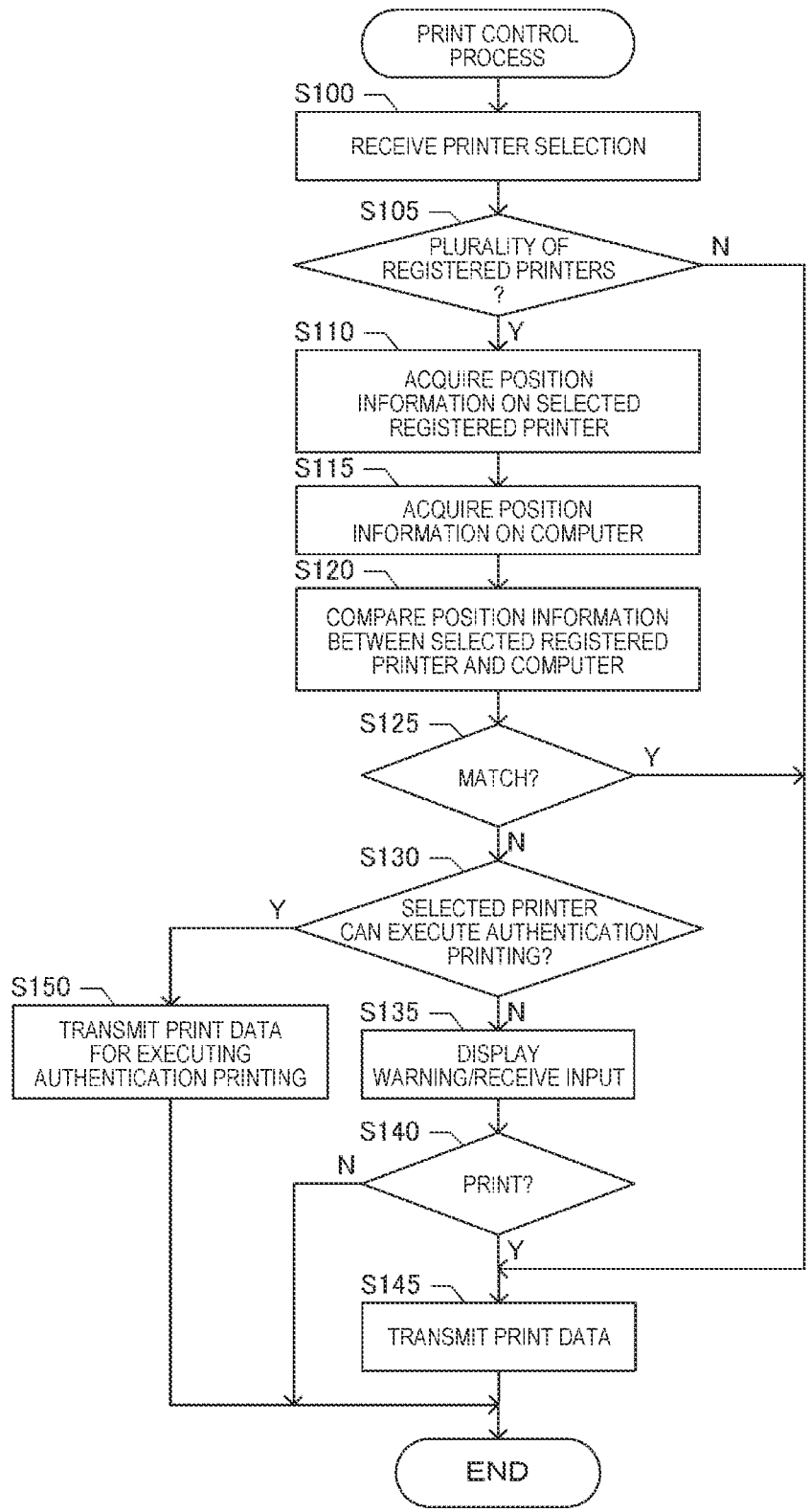
FIG. 6 is a flowchart of a print control process.

FIG. 6 is a flowchart of a print control process. When the user performs printing related to any contents, the user operates the input unit 10e of the computer 10 to perform input for starting a print process. The input may be performed by various methods, and for example, an instruction to start the print process under execution of an application program corresponds to the input.

When the input is performed, the processor 10a starts the print control process. When the print control process starts, the processor 10a receives the print setting. In this process, by the function of the selection unit 10a1, the processor 10a receives the selection of the registered printer (step S100). Specifically, the processor 10a refers to the registered printer list 10c2 and acquires the name of the registered printer. As a result, a printer selectable as the registered printer to execute printing is specified. The processor 10a also controls the display 10d to display the name of the registered printer as a choice and receives the registered printer selected by the user by operating the input unit 10e.

Next, the processor 10a determines whether there are a plurality of selectable registered printers (step S105). That is, the processor 10a refers to the registered printer list 10c2 and determines whether there are a plurality of registered printers. In step S105, when it is not determined that there are a plurality of registered printers, the processor 10a transmits the print data 10c1 to the selected registered printer by the function of the print control unit 10a3 (step S145).

When there are not a plurality of selectable registered printers, the registered printer is one near printer or one distant printer. Accordingly, in this case, there is only one choice, and thus the user is less likely to select an unintended printer. Therefore, in the embodiment, it is considered that a possibility of erroneous selection is low, and printing is performed without modifying the print setting. Specifically, the processor 10a regards the selected registered printer as the print execution printer. Based on contents of a print target, the processor 10a generates the print data 10c1 for printing according to the setting specified by the user and transmits the print data 10c1 to the server 30 together with information indicating the print execution printer. When the server 30 receives the print data 10c1, the server 30 identifies the print execution printer, identifies the global IP address of the print execution printer, specifies the global IP address and the print execution printer as a destination, and transmits the print data 10c1. As a result, printing is performed by the printer selected in step S100.

On the other hand, when it is determined in step S105 that there are a plurality of selectable registered printers, there is a possibility that a printer is erroneously selected. Therefore, the processor 10a executes step S110 and subsequent processes in order to prevent immediate printing when the distant printer is erroneously selected and the print instruction is issued while the near printer is intended. In step S110, the processor 10a acquires the position information on the selected registered printer by the function of the setting unit 10a2. That is, by the function of the setting unit 10a2, the processor 10a transmits, to the server 30 via the communication unit 10b, a transmission request for transmitting the position information on the registered printer selected in step S100. In response to the transmission request, the processor 30a of the server 30 refers to the registered printer information 30c1, acquires the position information on the requested registered printer, and returns the position information to the computer 10. As a result, the processor 10a acquires the coordinates and the global IP address of the registered printer selected in step S100.

Next, the processor 10a acquires the position information on the computer by the function of the setting unit 10a2 (step S115). Specifically, the processor 10a acquires the output signal of the GNSS reception unit 10f and identifies the coordinates of the computer 10. The processor 10a communicates with the router 12 via the communication unit 10b to acquire the global IP address assigned to the router 12.

Next, the processor 10a compares the position information between the selected registered printer and the computer by the function of the setting unit 10a2 (step S120). Specifically, by the function of the setting unit 10a2, the processor 10a determines whether the coordinates of the registered printer acquired in step S110 are within a specific distance from the coordinates of the computer 10 acquired in step S115. When the coordinates of the registered printer are within this range, it is determined that the coordinates of the computer 10 match the coordinates of the registered printer.

By the function of the setting unit 10a2, the processor 10a determines whether the global IP address acquired in step S115 is the same as the global IP address acquired in step S110.

When the coordinates and the global IP address are both matched, the registered printer is the near printer located in the area close to the computer 10. When the coordinates and the global IP address are not both matched, the registered printer is the distant printer located in the area far from the computer 10.

When the coordinates and the global IP address are both matched, that is, when the selected registered printer is the near printer, the processor 10*a* executes step S145 after a determination in step S125. That is, the processor 10*a* transmits the print data 10*c*1 to the server 30 without modifying the printer setting and executes printing using the registered printer selected in step S100 as the print execution printer according to the setting by the user.

When at least one of the coordinates and the global IP address is not matched, that is, when the selected registered printer is the distant printer, after the determination in step S125, the processor 10*a* determines, by the function of the setting unit 10*a*2, whether the selected printer can perform authentication printing (step S130). That is, the processor 10*a* refers to the registered printer list 10*c*2 and determines whether the printer selected in step S100 can perform authentication printing.

Figure 7:
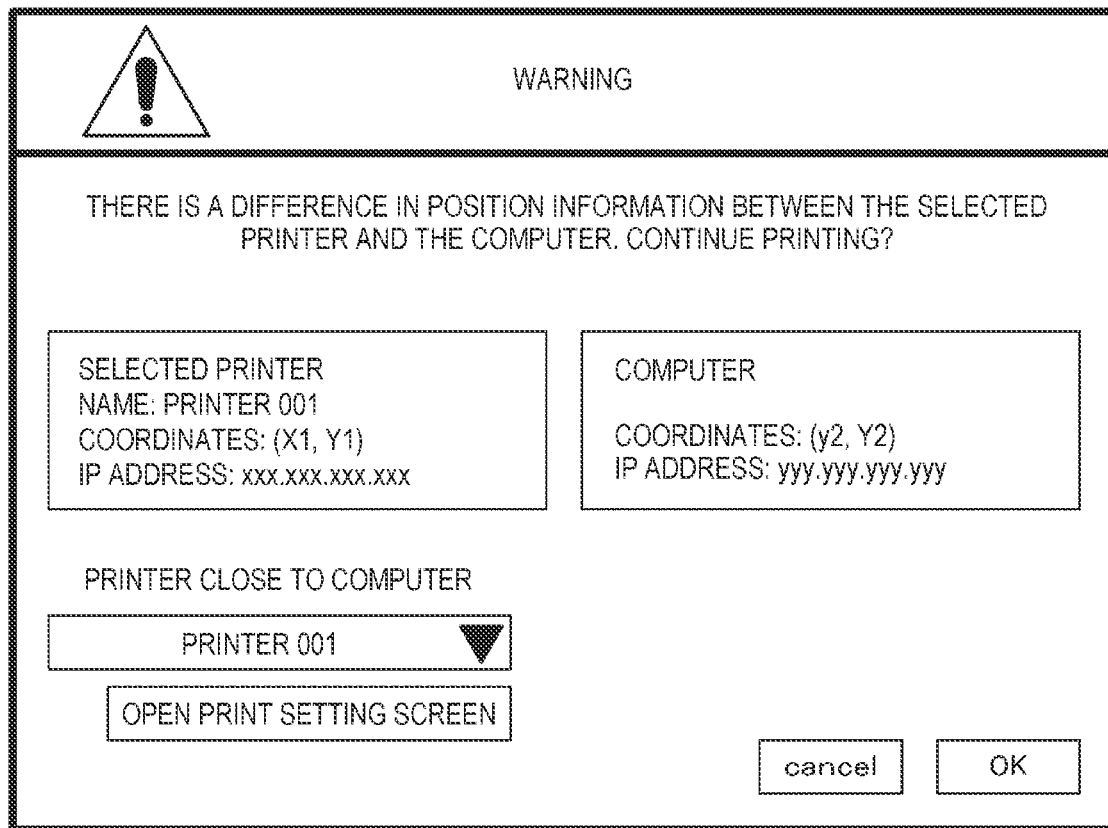
FIG. 7 shows an example of a warning screen.

When it is not determined in step S130 that the selected printer can execute authentication printing, the processor 10*a* controls the display 10*d* to display a warning and receives input from the user (step S135). Specifically, the processor 10*a* controls the display 10*d* to display a warning screen. FIG. 7 shows an example of the warning screen.

In the example shown in FIG. 7, an icon indicating a warning and characters "warning" are displayed in an upper portion, and warning contents are displayed below. The warning contents include characters indicating that the position information on the selected printer is different from that on the computer, and characters inquiring whether to continue printing. A box indicating the name, the coordinates, and the global IP address of the selected printer, and a box indicating the coordinates and the global IP address of the computer are also provided.

In the embodiment, introduction of a selectable near printer is also provided on the warning screen. In FIG. 7, characters "printer near computer" are shown, and a box displaying a choice of the printer is shown below. When the user operates the input unit 10*e* to specify the box, the processor 10*a* acquires a list of near printers. Specifically, the processor 10*a* acquires the coordinates of the computer 10 and the global IP address of the router 12 to which the computer 10 is connected, and transmits such information to the server 30 via the communication unit 10*b*.

The server 30 refers to the registered printer information 30*c*1 and acquires a registered printer to which coordinates within the specific range from the coordinates of the computer 10 are associated and whose global IP address matches that of the computer 10. That is, the server 30 acquires the printer ID of the near printer close to the computer 10. Then, the server 30 transmits the printer ID of the near printer to the computer 10 via the communication unit 30*b*.

The computer 10 controls the display 10*d* to display the printer ID of the near printer. The user can change the print execution printer by operating the input unit 10*e*, selecting a desired near printer, and issuing an instruction by an "open print setting screen" button. In this case, when the user performs the print setting, the processor 10*a* starts executing the process again from step S100. According to the above configuration, when the user is to print by a printer different from the intended printer, the user can print by the printer close to the user by selecting the introduced near printer. When there is no near printer, the introduction on the near printer is not performed.

On the screen shown in FIG. 7, an "OK" button and a "cancel" button are also displayed. When the user operates the input unit 10*e* and issues an instruction using the "cancel" button, the processor 10*a* determines in step S140 that there is no print execution instruction, and ends the print control process. With this configuration, the user can prevent the execution of the print control process when printing is to be performed by a printer different from the intended printer.

When the user operates the input unit 10*e* and operates the "OK" button on the screen shown in FIG. 7, the processor 10*a* determines in step S140 that there is a print execution instruction, and executes step S145. That is, the processor 10*a* assumes that there is an instruction to perform printing without changing the printer selected in step S100, and performs printing in step S145 without changing the print execution printer. With this configuration, in the first case where the selected printer is the distant printer, when the selected printer is not compatible with authentication printing, printing is not performed unless the user selects the near printer or explicitly instructs execution of printing by the distant printer. For this reason, it means that printing is not performed until an operation by the user is performed, and the setting for immediately printing is prohibited.

On the other hand, when it is determined in step S130 that the selected printer can perform authentication printing, the processor 10*a* transmits the print data 10*c*1 for performing authentication printing (step S150). Specifically, when it is set in the print data 10*c*1 generated by the print control unit 10*a*3 that authentication printing is not performed, the processor 10*a* modifies the information on authentication printing by the function of the setting unit 10*a*2, and changes the setting to perform authentication printing. When it is set in the print data 10*c*1 generated by the print control unit 10*a*3 that authentication printing is to be performed, the processor 10*a* does not modify the information on authentication printing. The processor 10*a* transmits, to the server 30, the print data 10*c*1 set to perform authentication printing together with the information indicating the print execution printer. When the server 30 receives the print data 10*c*1, the server 30 identifies the print execution printer, identifies the global IP address of the print execution printer, specifies the global IP address and the print execution printer as a destination, and transmits the print data 10*c*1.

As a result, the print data 10*c*1 is stored in the non-volatile memory of the printer selected in step S100. The user moves to the printer, performs authentication by performing the log-in operation, and instructs execution of printing, thereby causing the printer to print. According to the above configuration, when there is a possibility that the distant printer is erroneously selected, it is possible to prevent immediate printing, and it is possible to reduce a possibility of printing on the distant printer unintentionally by the user.

(3) Other Embodiments

The above embodiment is an example for implementing the disclosure, and various other embodiments may be adopted. For example, the apparatus configuration of the print control system is not limited to the configuration shown in FIG. 1. For example, the computer 20 may not be located in the area 2, or there may be two or more printers in each of the areas 1 and 2. In addition, there may be three or more areas. The terminals shown in FIG. 1 may be a smaller number of terminals sharing functions, or may be a larger number of terminals. For example, the computer 10 and the printer 11 may be an integrated apparatus, and the server 30 may be the same terminal as at least one of the computers 10 and 20 located in each area. Further, each terminal may be constituted by a larger number of terminals such as the server 30 being a cloud server.

A mode as in the embodiment described above in which the warning can be issued according to the printer selected by the user, and a mode in which no warning is issued may be selected in advance by the user. In the first place, the function of issuing the warning may not be provided.

The position information may be various types of information as long as the position information is information indicating a position, and the information may be acquired by various methods such as acquiring from an external apparatus or manually inputting by the user. For example, the information is not limited to the GNSS information indicating the position of the area and the IP address assigned to the area, and may be an address of the area, a service set identifier (SSID) of the router located in the area, or any combination thereof. The address of the area may be information indicating a place identified by a name, a numerical value, a symbol, or the like of an administrative district. For example, the address may be specified by the user inputting the address, and the address including the coordinates specified by the GNSS information or the like may be identified by an address management server or by various methods. When the router 12 is a wirelessly communicable router, an SSID is assigned to the router 12. For this reason, apparatuses that perform wireless communication using a common SSID can be regarded as being located in the same area. Various other types of information may be used as the position information. For example, a position of a terminal (the printer or the computer) may be identified using a communication state between a wireless LAN base station or a mobile phone network base station and the terminal.

The coordinates of the above-described printers 11 and 21 are identified using the GNSS reception unit, and an area where a printer including no GNSS reception unit is located may be identified based on coordinates of another apparatus or the like. For example, if the computer 10 located near the printer 11 includes a GNSS reception unit, the coordinates of the computer 10 acquired by the GNSS reception unit may be registered in the registered printer information 30$c$1 as coordinates for identifying the area of the printer 11.

Figure 8:
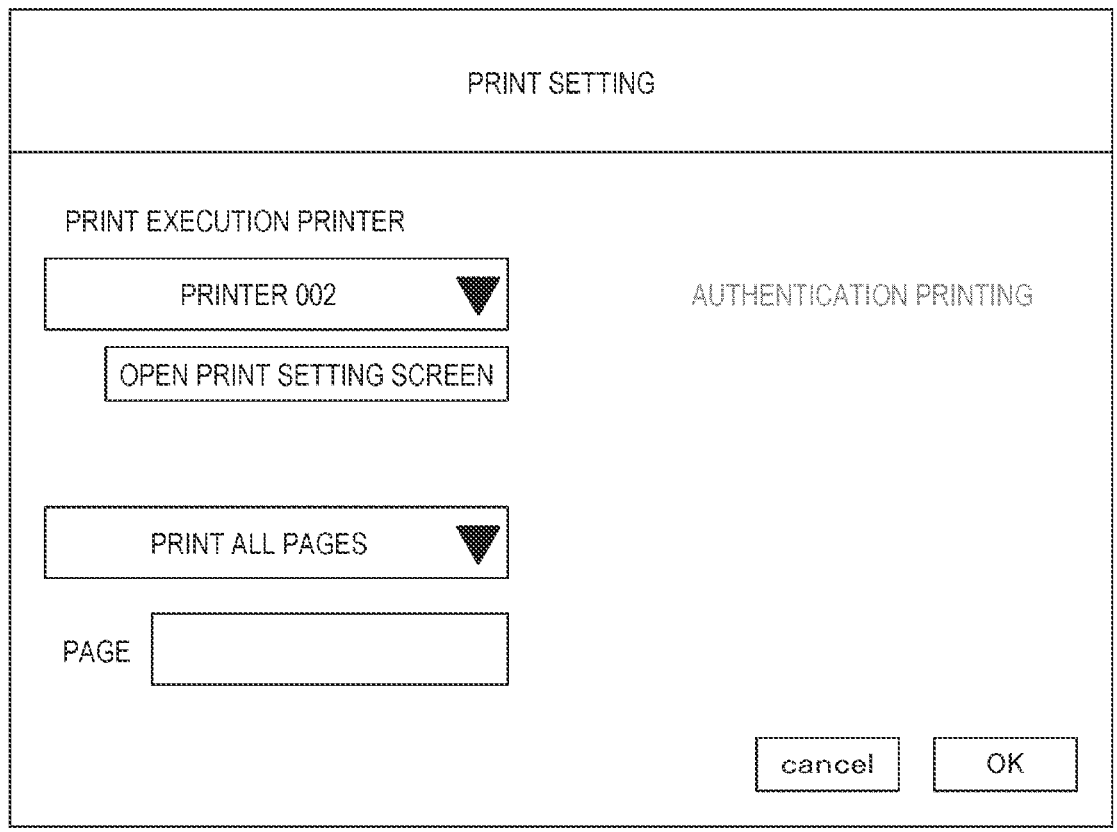
FIG. 8 shows an example of a setting screen for a print setting.

Various configurations can be adopted as the configuration for prohibiting the setting for immediately printing. For example, on the setting screen on which the print setting is performed by the user, in the first case, if selection of the setting for immediately printing is disabled, the user cannot select the setting for immediately printing. As a result, the setting for immediately printing is prohibited. FIG. 8 is an example of such a setting screen. FIG. 8 is a screen on which the print execution printer and a print target page can be specified.

The screen shown in FIG. 8 includes a radio button for specifying whether to execute authentication printing. That is, each time the user selects the radio button, execution and non-execution of authentication printing can be switched. In the embodiment, when the printer 002 which is the distant printer is selected as the print execution printer, authentication printing is fixed in a selected state, and the user cannot change the setting.

That is, when the distant printer is selected as the print execution printer as shown in FIG. 8, the radio button for specifying whether to execute authentication printing is fixed to a state indicating execution of authentication printing and grayed out. In this state, the user cannot perform any operation on the radio button. With this configuration, it is possible to forcibly perform authentication printing when the user selects the distant printer.

Figure 9:
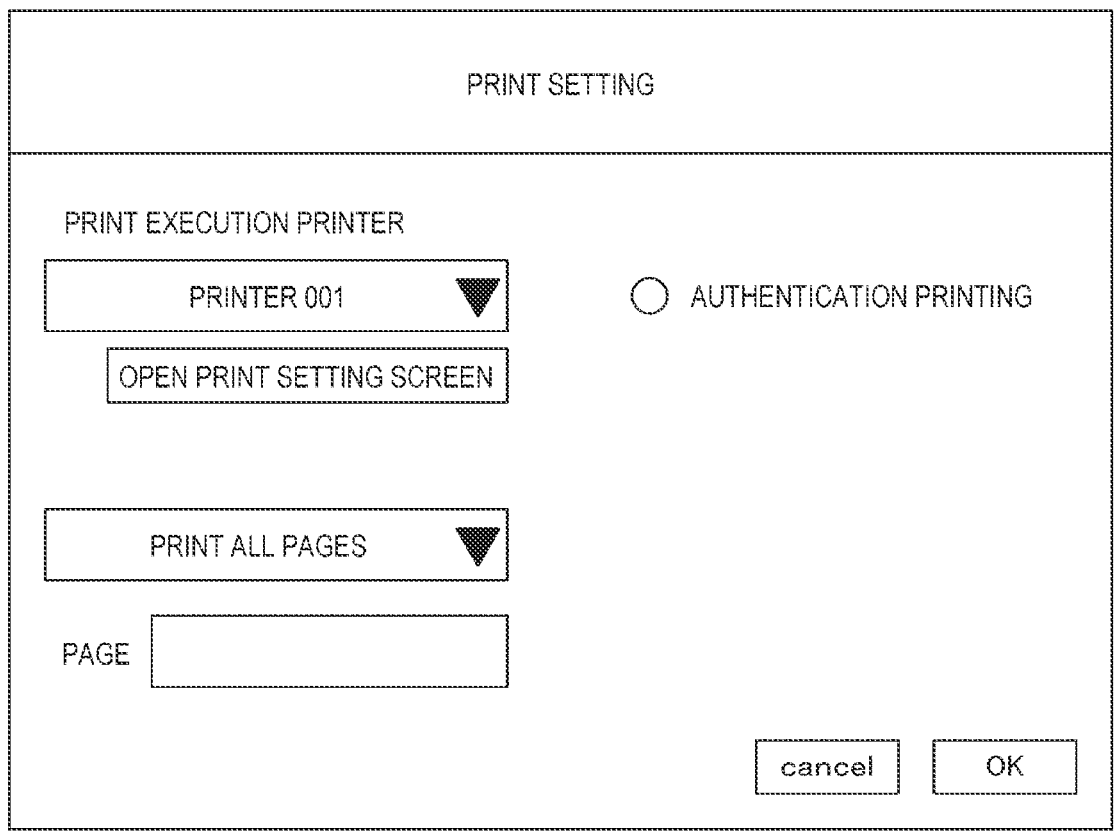
FIG. 9 shows an example of a setting screen for a print setting.

Meanwhile, with such a configuration, in the second case, it is still possible to select the setting for immediately printing on the setting screen. FIG. 9 shows an example of the second case. That is, when the printer 001, which is the near printer, is selected, the selection of the radio button is enabled. As a result, in the second case, it is possible to determine whether to perform authentication printing according to an intention of the user.

The selection unit may be able to receive selection of one printer from selectable printers. That is, the selection unit may be able to select the printer to perform printing. The selectable printers may be registered in the server 30 in advance as in the above-described embodiment, or may be registered in the computers 10 and 20.

The determination of whether the printer is the near printer located in the same area as the computer 10 or the distant printer located in the different area is not limited to that described above. A determination of whether a positional relationship between the printer and the computer satisfies a predetermined condition is substantially the same. That is, in a process of specifying setting contents by the setting unit, it may be determined that the selected printer is the near printer when the selected printer is located near the computer used by the user and that the selected printer is the distant printer when the selected printer is far from the computer used by the user, or it may be determined whether the positional relationship between the printer and the computer matches as in the above-described embodiment.

The area is a concept for comparing whether the printer is close when viewed from the user or the computer used by the user, and may be a point or a region having a finite area. A value indicating a size of the area, for example, a distance from coordinates where a device is located may be set in advance and may have various values such as 1 km and 100 m. In addition, the concept is not limited to a concept in which belonging or not belonging to the area can be defined based on a physical distance relationship, such as a point or a region, and may be a concept in which belonging or not belonging to the area can be defined without depending on the physical distance relationship. For example, a configuration in which a plurality of devices connected to a router to which a specific global IP address is assigned belong to the same area corresponds to the latter concept. If the computer can receive a wireless signal generated by the printer, the printer may be determined to be the near printer, and if the computer cannot receive the wireless signal, the printer may be determined to be the distant printer.

The setting unit may be able to prohibit the setting for immediately printing in the first case where the selected printer is the distant printer, and to permit the setting for immediately printing in the second case where the selected printer is the near printer. That is, when an influence of erroneous selection is large, the selection unit may be set to prevent immediate execution of printing. The setting for immediately printing is a setting for performing the print process by the printer immediately in response to the print execution instruction. Accordingly, if there is no job waiting for printing, the printer starts the print process based on the print data in response to the print instruction. If there is a job waiting for printing, a job to be printed according to the print instruction is added to a print waiting queue in a desired order.

When the setting for immediately printing is prohibited, the print instruction initially performed by the user in the print control apparatus is not a trigger for starting printing by the printer. When the setting for immediately printing is prohibited, the trigger for printing is not limited to the authentication operation by the user as in the above-described embodiment. For example, printing by the printer may be started after a lapse of a predetermined time since the print instruction. Printing may be started by the user by directly operating the printer to select the print data and instructing printing without performing authentication. Alternatively, printing may be started when a sensor detects that the user arrives at the vicinity of the printer.

The print control unit may be able to transmit the print data to the selected printer and cause the printer to print according to the setting of the setting unit. That is, the print control unit may control the selected near printer or distant printer and cause the printer to print according to the setting of the setting unit. The setting may be provided in the print data or may be indicated by data transmitted together with the print data. In the above-described embodiment, the print data is transmitted to the server even when the near printer is selected, and the print data is transmitted from the server to the near printer to perform printing, and the print data may also be transmitted from the computer to the near printer.

The present disclosure is also applicable to a program and a method executed by a computer. The system, the program, and the method as described above may be implemented as a single apparatus, may be implemented using components provided in a plurality of apparatuses, and each element may be provided in an apparatus different from the above-described apparatus, and various aspects may be included. Changes can be made as appropriate, such as a part being software and a part being hardware. Further, the present disclosure may be implemented as a recording medium of a program for controlling a system. Of course, the recording medium of the program may be a magnetic recording medium or a semi-conductor memory, and the same is true for any recording medium to be developed in the future. In addition, which apparatus performs which process can be appropriately changed. For example, whether the printer is the near printer or the distant printer may be determined by the server 30, or the print data generated by the computer may be transmitted to the printer via the server and the setting of the print data may be changed by the setting unit of the server.

What is claimed is:

1. A print control apparatus comprising:
   a processor including
      a selection unit configured to receive selection of one printer from selectable printers,
      a setting unit configured to
         compare position information of a selected printer that is the one printer for which the selection has been received at the selection unit and position information of the print control apparatus, thereby determining that the selected printer is a distant printer located in an area different from the print control apparatus or a near printer located in the same area as the print control apparatus,
         prohibit, in a first case where the selected printer has been determined to be the distant printer, a setting for immediately printing, and
         permit, in a second case where the selected printer has been determined to be the near printer, the setting for immediately printing, and
      a print control unit configured to transmit print data to the selected printer and cause the selected printer to print according to the setting of the setting unit.

2. The print control apparatus according to claim 1, wherein
   in the first case, the setting unit changes the setting for immediately printing to a setting for printing after a user arrives at the selected printer.

3. The print control apparatus according to claim 2, wherein
   the setting for printing after the user arrives is a setting for printing after the user directly operates the selected printer.

4. The print control apparatus according to claim 1, wherein
   in the first case, the setting unit disables, on a setting screen, selection of the setting for immediately printing.

5. The print control apparatus according to claim 4, wherein
   in the second case, the setting unit enables, on the setting screen, the selection of the setting for immediately printing.

6. The print control apparatus according to claim 1, wherein
   the selection unit receives selection of the one printer from registered printers registered in advance in association with information indicating areas of the registered printers, and
   the setting unit determines that the selected printer is the near printer when an area registered in association with the selected printer is the same as the print control apparatus, and determines that the selected printer is the distant printer when the registered area is different from the print control apparatus.

7. The print control apparatus according to claim 6, wherein
   the setting unit determines whether the selected printer is the near printer or the distant printer using at least one of GNSS information indicating a position of the area, an address of the area, an SSID of a router located in the area, and an IP address assigned to the area.

8. A method for producing a printed object to be printed by transmitting print data to a selected printer, the method comprising:
   receiving selection of one printer from selectable printers:
   comparing position information of the selected printer that is the one printer for which the selection has been received and position information of a user, thereby determining that the selected printer is a distant printer located in an area different from an area where the user is located or a near printer located in the same area as the area where the user is located;
   generating, in a first case where the selected printer has been determined to be the distant printer, print data with a setting for not immediately printing;
   generating, in a second case where the selected printer has been determined to be the near printer, print data with a setting desired by the user between a setting for immediately printing and the setting for not immediately printing; and
   producing the printed object by causing the selected printer to print based on the print data.

9. A non-transitory computer-readable storage medium storing a print control program, the program comprising:
   causing a computer to operate as
   a processor including
      a selection unit configured to receive selection of one printer from selectable printers;

a setting unit configured to
- compare position information of a selected printer for which the selection has been received at the selection unit and position information of the computer, thereby determining that the selected printer is a distant printer located in an area different from an area where the computer is located or a near printer located in the same area as the area where the computer is located,
- generate, in a first case where the selected printer has been determined to be the distant printer, print data with a setting for not immediately printing, and
- generate, in a second case where the selected printer has been determined to be the near printer, print data with a setting desired by a user between a setting for immediately printing and the setting for not immediately printing, and a print control unit configured to cause the selected printer to print according to the setting of the setting unit.

* * * * *